United States Patent
Shann et al.

(10) Patent No.: US 9,117,025 B2
(45) Date of Patent: *Aug. 25, 2015

(54) TRACKING OF CODE BASE AND DEFECT DIAGNOSTIC COUPLING WITH AUTOMATED TRIAGE

(75) Inventors: Katherine M. Shann, Eastleigh (GB); Matthew D. Whitbourne, Horndean (GB); Daniel E. Would, Eastleigh (GB); Shanna Xu, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 891 days.

This patent is subject to a terminal disclaimer.

(21) Appl. No.: 13/210,941

(22) Filed: Aug. 16, 2011

(65) Prior Publication Data

US 2013/0047140 A1    Feb. 21, 2013

(51) Int. Cl.
  *G06F 9/44*   (2006.01)
  *G06F 11/36*  (2006.01)

(52) U.S. Cl.
  CPC .............. *G06F 11/3664* (2013.01); *G06F 8/30* (2013.01)

(58) Field of Classification Search
  CPC ............ G06F 11/3688; G06F 11/3684; G06F 11/3664; G06F 11/263
  USPC .................................................. 717/127–128
  See application file for complete search history.

(56) References Cited

U.S. PATENT DOCUMENTS

| | | | |
|---|---|---|---|
| 5,778,169 A | 7/1998 | Reinhardt | |
| 6,738,928 B1 * | 5/2004 | Brown | 714/26 |
| 7,685,471 B2 | 3/2010 | Rajan et al. | |
| 7,774,760 B2 | 8/2010 | Mishra et al. | |
| 7,882,495 B2 | 2/2011 | Tillmann et al. | |
| 2002/0091907 A1 * | 7/2002 | Pouliot et al. | 712/1 |
| 2003/0070120 A1 * | 4/2003 | Michael et al. | 714/38 |
| 2005/0125406 A1 | 6/2005 | Cina | |
| 2007/0006037 A1 * | 1/2007 | Sargusingh et al. | 714/38 |
| 2007/0300208 A1 * | 12/2007 | Furukawa et al. | 717/127 |
| 2008/0141221 A1 | 6/2008 | Benesovska et al. | |

(Continued)

OTHER PUBLICATIONS

Fernando Raposo Da Camara Silva, et al., A Component Testing Approach Supported by a CASE Tool, Proceedings of the 35th Euromicro Conference on Software Engineering and Advanced Applications, Aug. 27-29, 2009, pp. 466-469 (plus 1 citation page), IEEE Xplore Digital Library, IEEE, Published on the World Wide Web.

(Continued)

*Primary Examiner* — Chat Do
*Assistant Examiner* — Sergio J Curbelo, III
(74) *Attorney, Agent, or Firm* — Lee Law, PLLC; Christopher B. Lee

(57) ABSTRACT

In response to a test case error generated by execution of a test case against a code build, a source code segment that caused the test case error is identified by a defect monitor. The identified source code segment is linked to the test case that generated the test case error. The linked source code segment is monitored for code changes. A determination is made as to whether a test case re-execution criterion associated with the test case has been satisfied based upon a detected code change of the linked source code segment. An indication to re-execute the test case is generated in response to determining that the test case re-execution criterion associated with the test case has been satisfied.

14 Claims, 5 Drawing Sheets

(56) References Cited

U.S. PATENT DOCUMENTS

2010/0180259 A1     7/2010   Lindley
2011/0145793 A1     6/2011   Alexander et al.

OTHER PUBLICATIONS

United Kingdom Intellectual Property Office, Combined Search and Examination Report for Application No. GB1213833.5, Nov. 21, 2012, pp. 1-6, South Wales, United Kingdom.

W. Eric Wong, et al., A Study of Effective Regression Testing in Practice, Proceedings of the Eighth International Symposium on Software Reliability Engineering, Nov. 1997, pp. 264-274, IEEE Computer Society, Washington, DC, USA.

Adenilso Da Silva Simao, et al., A Technique to Reduce the Test Case Suites for Regression Testing Based on a Self-Organizing Neural Network Architecture, Article: 30th Annual International Computer Software and Applications Conference, Sep. 17-21, 2006, pp. 93-96, IEEE Computer Society, Washington, DC, USA.

United States Patent and Trademark Office, Office Action for U.S. Appl. No. 13/434,663, Apr. 10, 2014, pp. 1-30, Alexandria, VA, USA.

United States Patent and Trademark Office, Office Action for U.S. Appl. No. 13/434,663, Jul. 31, 2014, pp. 1-28, Alexandria, VA, USA.

United States Patent and Trademark Office, Notice of Allowance for U.S. Appl. No. 13/434,663, Apr. 1, 2015, pp. 1-16, Alexandria, VA, USA.

\* cited by examiner

300

TRACKING OF CODE BASE AND DEFECT DIAGNOSTIC COUPLING WITH AUTOMATED TRIAGE

BACKGROUND

The present invention relates to software defect management and correction. More particularly, the present invention relates to tracking of code base and defect diagnostic coupling with automated triage.

For a given product that is under development, a development group may be responsible for code development for the product and a test group may be responsible for testing the product. Test cases may be generated either by the development group or the test group to test the developed code. The test cases may be executed to test the product and any defects may be identified and reported for correction by either the development group or the test group. When any test case completes without error, the code under test may be considered to have passed that particular test case.

BRIEF SUMMARY

A method includes identifying, via a defect monitor in response to a test case error generated by execution of a test case against a code build, a source code segment that caused the test case error; linking the identified source code segment to the test case that generated the test case error; monitoring the linked source code segment for code changes; determining whether a test case re-execution criterion associated with the test case has been satisfied based upon a detected code change of the linked source code segment; and generating an indication to re-execute the test case in response to determining that the test case re-execution criterion associated with the test case has been satisfied.

A system includes a code repository and a processor programmed to identify, in response to a test case error generated by execution of a test case against a code build, a source code segment within the code repository that caused the test case error; link the identified source code segment to the test case that generated the test case error; monitor the linked source code segment within the code repository for code changes; determine whether a test case re-execution criterion associated with the test case has been satisfied based upon a detected code change of the linked source code segment; and generate an indication to re-execute the test case in response to determining that the test case re-execution criterion associated with the test case has been satisfied.

A computer program product includes a computer readable storage medium including computer readable program code, where the computer readable program code when executed on a computer causes the computer to identify, in response to a test case error generated by execution of a test case against a code build, a source code segment that caused the test case error; link the identified source code segment to the test case that generated the test case error; monitor the linked source code segment for code changes; determine whether a test case re-execution criterion associated with the test case has been satisfied based upon a detected code change of the linked source code segment; and generate an indication to re-execute the test case in response to determining that the test case re-execution criterion associated with the test case has been satisfied.

DETAILED DESCRIPTION

Figure 1:
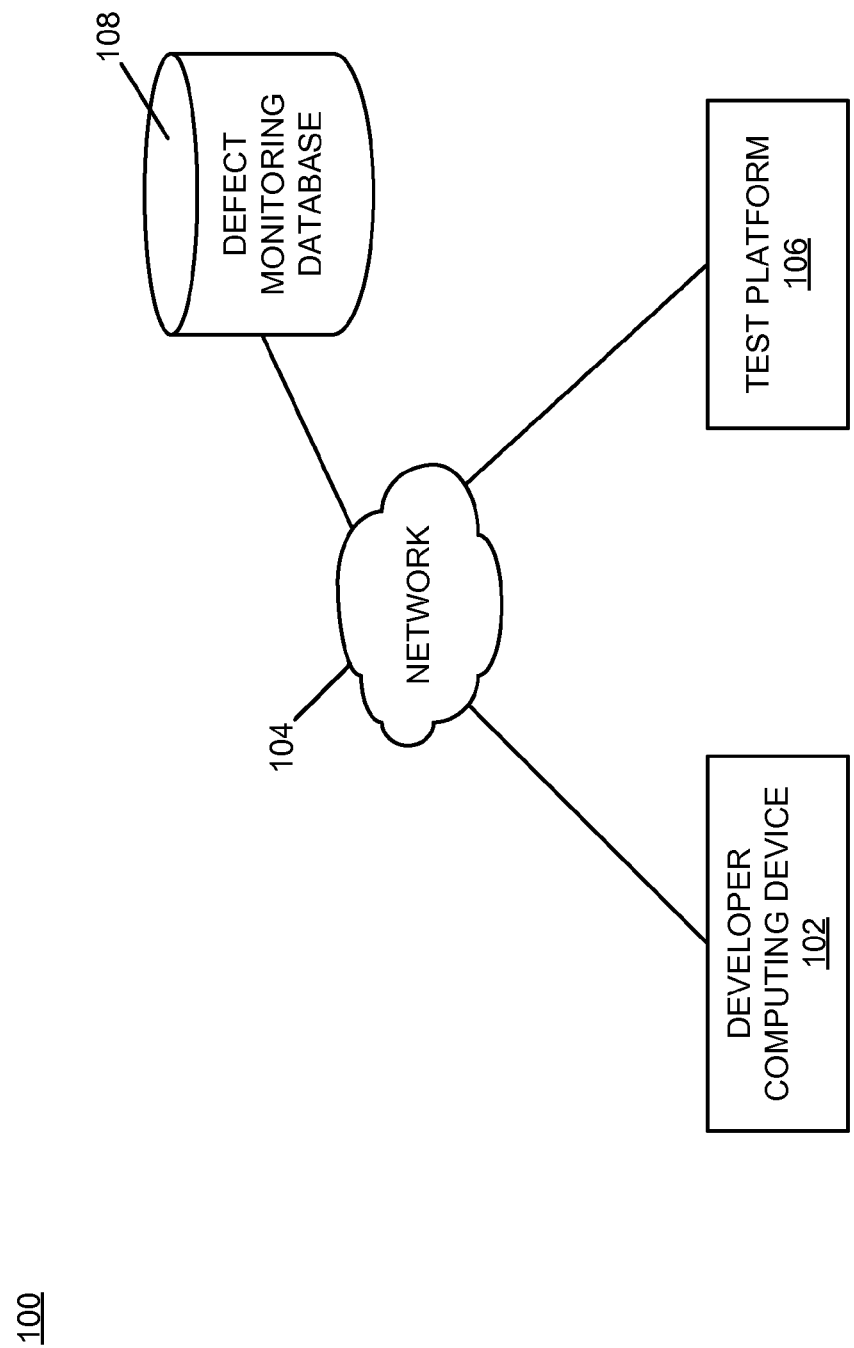
FIG. 1 is a block diagram of an example of an implementation of a system for automated tracking of code base and defect diagnostic coupling with automated triage according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides tracking of code base and defect diagnostic coupling with automated triage. Test case errors that result from execution of a test case against a code build are coupled to an identified source code segment that caused the test case error, and the coupling is tracked over time as source code changes occur. A stack trace associated with the test case error may be analyzed to identify the source code segment that caused the error. The identified source code segment is monitored for code changes. The code changes are analyzed and a determination is made as to whether to re-execute the test case. A code change threshold may be configured, for example, based upon an execution duration a test case (e.g., a few seconds, a few days, etc.), or other criteria. Additionally, where code has changed significantly, a test case may be automatically flagged as obsolete. Many other possibilities exist for tracking of code base and defect diagnostic coupling with automated triage. As such, the present subject matter allows re-execution of test cases to be managed in a dynamic automated manner based upon the coupling of the code base and the defect diagnostics represented by the test cases, and the tracking of that coupling over time.

It should be noted that conception of the present subject matter resulted from recognition of certain limitations associated with defect management. For example, it was observed that, within a product release cycle, defects may be raised that are not addressed by developers until days or weeks later. During this time period, additional development work may have occurred within code areas related to the defect. If a developer receives notification to correct a defect, the developer may not know whether the changes made to the code as part of the development process have rendered the defect invalid. At this point, the developer often requests that the tester re-execute the automated or manual test that generated the defect. It is noted that some tests may take hours or days to complete. As such, this re-executing of tests where defects are invalid due to additional code development has been recognized to utilize testing resources that may be used for other testing that is relevant, has been recognized to be an inefficient use of resources, and is time consuming for both the developer and the tester. The present subject matter improves defect management by providing for identification of coupling between code sections/segments of a code base and defects that are raised. These couplings between code sections/segments of a code base and defects that are raised is tracked as the code base changes to determine whether the code base has diverged to the extent to render the defect obsolete or to justify re-execution of one or more test cases. As such, improved defect management and test efficiency may be obtained through the automated tracking of code base and defect diagnostic coupling with automated triage, as described above and in more detail below.

For purposes of the present description, a "defect" may be considered equivalent to and/or identified by or correlated with a "test case error." A defect may further be considered an error with a code segment identified via a test case, or any other error associated with a code base. Further, a code segment/section, such as a method or procedure, may be referenced generally herein as a "function."

The present subject matter provides a new/additional defect monitoring component within a test environment that associates/couples code segments/sections (e.g., methods/procedures and/or lines of code) within a code base with a given defect that has been identified. The defect monitoring component monitors the code base to track the coupling of the code base and defect diagnostic, and takes appropriate actions in response to determining that the code base has changed sufficiently to justify re-testing. For example, where a test case requires several hours or days to execute, the monitoring component tracks code changes for code segments that are associated with a given coupled defect. Where the code changes have exceeded a code change threshold or delta, the test case is either re-executed in an automated manner, flagged for re-execution during a subsequent scheduled automated test sequence, or is flagged for re-execution by manual intervention.

The code change threshold or delta may be represented by a test case re-execution criterion or by multiple test case re-execution criteria. These test case re-execution criteria may be evaluated in response to code changes to determine whether to re-execute a particular test case. Alternatively, where the code changes have rendered the defect moot or obsolete, this information may also be preserved to indicate, for example, that the test case needs to be changed or that it may be removed from a test suite. As such, where the coupling between the code base and the defect has diverged sufficiently that the test case no longer applies, the test case may be flagged as obsolete and may be updated or removed from a test suite. Many other possible actions are possible and all are considered within the scope of the present subject matter.

The defect monitor may operate as a stand-alone module that additionally implements defect management tool capabilities, and may interface with or implement version control and test case management. Alternatively, the defect monitor may form a portion of a defect management tool, or may operate in conjunction with a defect management tool, a version control tool, and a test case management tool, as appropriate for a given implementation.

The defect monitor monitors a code base, and the respective coupling to a defect, by periodically or aperiodically checking the code area or code segment that is associated with a defect to ascertain whether the defect is still relevant to the code. The association or coupling between defect and code may be achieved with a variety of approaches. For example, for those languages, such as Java®, that produce stack traces, the stack traces may be analyzed to identify code sections that are associated with an identified defect, and the identified defect may be coupled to the identified code section.

Stack traces may be used to identify method/procedure invocation or calls, and to identify method/procedure return. As such, where an error or defect is observed after a particular method or procedure is called and before the method or procedure returns, that method or procedure may be considered a candidate code segment for monitoring for code changes. Additionally, it should be noted that defects may occur with latency. In such a situation a method or procedure that is identified within the stack trace to have already returned at the time of observation of a particular defect may be considered a candidate for monitoring for code changes. As such, defects may be correlated with one or more code segments based upon a variety of stack analysis and code analysis techniques.

Any code section(s) correlated with a particular defect may then be monitored and once the defect and code section have been judged to have sufficiently diverged, an indication to re-execute the associated test case may be generated. Additionally, depending on whether the system includes a test case management tool, the defect monitor may alert the test case management tool via the indication. The test case management tool may then re-execute the automated test that discovered the defect and return the results of that test to the defect monitor. The defect monitor may then append the result output to the relevant defect. Alternatively, the test case management tool may flag a manual test case to be re-executed, and results may be input to the test case management tool that may then be returned to the defect monitor to be appended to the relevant defect. As another alternative, where there is no test case management tool that either forms a part of or that interfaces with the defect monitor, the defect monitor may email or otherwise provide a message to the originator of the defect to inform the originator that the code base has diverged sufficiently from the code level that the defect was raised against to justify re-executing the test case, and may append a comment to the defect. The originator may then take the appropriate action. Other possibilities exist for test case management and re-execution, and all are considered within the scope of the present subject matter.

Regarding the scenario where a test case management tool is available and is integrated with the defect monitor, either within the same module or by an appropriate interface mechanism, the following example processing may be performed. For purposes of the present examples, it is assumed that the test case management tool may be configured to output a stack trace or other suitable code identification information that may be used to couple an identified defect with a code segment/section of a code base.

In response to a defect being raised against a certain level/revision of code, the defect monitor may detect/identify the defect. The defect may include, within the present example, stack trace information output by the test case. However, as indicated above, any information suitable for identification of a code segment associated with a defect may be used.

The originator of the defect or the defect monitor links the defect to the test case in the test case management tool that generated the defect either via automated or manual processing. This linking may occur in the defect management tool and be picked up by the defect monitor, or be performed by the defect monitor itself. The defect monitor utilizes the stack trace information to link or couple the defect to the relevant method(s)/procedure(s) and/or line(s) of code in the code base.

In response to delivery of a new level/revision of the code base or code segment, the defect monitor compares the stack trace in the defect with the new level/revision of code. If the code that is relevant to the defect is determined to have diverged sufficiently from the level of code linked to within the defect and referenced by the stack trace, the defect monitor alerts the test case management tool that the test case that generated the defect should be re-executed. If the code that is relevant to the defect is determined not to have diverged sufficiently from the level of code linked to within the defect and referenced by the stack trace, the processing may iterate and respond to a subsequent new level/revision of code.

It should be noted that if the test case is a manual test case, the manual test case may be flagged for re-execution by a tester. If the test case is automated, then the test case management tool may re-execute the test case and the result output may be appended to the defect, either by the test case management tool or by the defect monitor.

Regarding the scenario where a test case management tool is not available, in response to a defect being raised against a certain level/revision of code, the defect monitor may detect/identify the defect. The defect may include, within the present example, stack trace information output by the test case. However, as indicated above, any information suitable for identification of a code segment associated with a defect may be used.

The originator of the defect links the defect to the test case in the test case management tool that generated the defect either via automated or manual processing. This linking may occur in the defect management tool and be picked up by the defect monitor, or be performed by the defect monitor itself. The defect monitor utilizes the stack trace information to link or couple the defect to the relevant method(s)/procedure(s) and/or line(s) of code in the code base.

In response to delivery of a new level/revision of the code base or code segment, the defect monitor compares the stack trace in the defect with the new level/revision of code. If the code that is relevant to the defect is determined to have diverged sufficiently from the level of code linked to within the defect and referenced by the stack trace, the defect monitor alerts the tester that the test case that generated the defect should be re-executed. If the code that is relevant to the defect is determined not to have diverged sufficiently from the level of code linked to within the defect and referenced by the stack trace, the processing may iterate and respond to a subsequent new level/revision of code.

The present example differs from the processing for a scenario that includes a test case management tool in that defect monitor alerts the originator of the defect that the defect may no longer apply to the latest level of code and annotates the defect with this information. The originator may take whatever action that is appropriate for the particular situation, such as deleting the defect from defect logs, marking the defect as resolved, or other action as appropriate.

Regarding relevance of code to defects, many possibilities exist for determining whether code changes result in code that is no longer relevant to linked defects. Metrics may be defined to measure code divergence, and as such, relevance to monitored and coupled defects. For example, one metric that may be used to determine whether the defect is still relevant to a new level/revision of code may include a determination of whether the methods/procedures named in the stack trace were deleted, renamed, or moved to another file within the code base. Alternatively or additionally, another metric that may be used to determine whether the defect is still relevant to a new level/revision of code may include a determination of whether more than a configured number of lines (e.g., X lines) of code have changed in one of the methods/procedures named in the stack trace. Another example metric may include a determination of whether individual code line numbers represented within the stack trace have changed by more than a certain amount or percentage (e.g., Y percent). Many other metric possibilities exist and all are considered within the scope of the present subject matter.

Regarding code change thresholds for initiating re-testing and re-execution of test cases, as described above, a code change threshold or delta may be represented by a test case re-execution criterion, or by one or more test case re-execution criteria. A test case re-execution criterion may include a single threshold metric/constraint or may include multiple metrics/constraints that are met to cause initiation of re-execution of a test case.

For example, a test case re-execution criterion based solely on code changes may include any of the metrics described above, such as a code change threshold metric (e.g., a number of lines of code that have changed). In such an implementation, a test case may be re-executed in response to detection of a change equivalent to or exceeding the defined code change threshold.

Alternatively, multiple test case re-execution criteria may be evaluated and satisfied prior to providing an indication to re-execute a test case. For example, in addition to a code change metric, an additional test case re-execution criterion may incorporate information about the length of time that a test case takes to execute. As such, if a test case takes two (2) seconds to execute, then the threshold for code changes to justify re-execution of the test case may be set lower than for a test case that takes several hours or days to execute.

Additionally, a test case re-execution criterion may incorporate information about test case priority and/or defect severity. As such, in addition to a code change threshold, test case priority and defect severity may be correlated to leverage the relative importance or severity of the associated defect for providing an indication to re-execute a test case. As such, if a test case has a relatively high priority relative to other test cases and the defect is of a relatively high severity relative to other defects (e.g., which may suggest a proportional correlation between test case priority and defect severity), then the test case may be re-executed in response to a moderate code change threshold. Alternatively, where either the test case priority or defect severity are relatively low (e.g., which may suggest a disproportional correlation between test case priority and defect severity), then the test case may be re-executed in response to a higher code change threshold.

As another example, a test case re-execution criterion may include information about authorized frequency of testing to provide automated coordination of test facilities or devices. As such, a test may be configured as authorized, for example, to be executed once per week during non-peak hours for the system under test. In such a configuration, the test case re-execution criterion may be configured to identify a code change threshold as a preliminary re-execution threshold criterion and an authorized time for test execution as a second tier threshold test case re-execution criterion.

Many other possibilities exist for test case re-execution criteria and all are considered within the scope of the present subject matter. For purposes of the present description, it is understood that a configurable set of test case re-execution criteria are available and that each test case re-execution criterion may be individually configured to provide a dynamic set of metrics for code analysis and test case re-execution.

Further, the scope of code monitoring for changes may be configured in an automated manner or may be configured by a tester where other factors may be relevant and more efficiently resolved through manual intervention (e.g., tester is unavailable during a certain period). Further, the defect monitoring and test re-execution may be over-ridden by a tester/test administrator to allow selection and re-configuration of the scope and granularity of testing, or where it may be preferable to avoid automated initiation of a particular test case.

The tracking of code base and defect diagnostic coupling with automated triage described herein may be performed in real time to allow prompt management of defects and tracking for coupling of defects and a code base. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated tracking of code base and defect diagnostic coupling with automated triage. A developer computing device 102 communicates via a network 104 with a test platform 106 and a defect monitoring database 108.

As will be described in more detail below in association with FIG. 2 through FIG. 5, the developer computing device 102 provides automated tracking of code base and defect diagnostic coupling with automated triage. The automated tracking of code base and defect diagnostic coupling with automated triage is based upon identification of testing defects, coupling of the testing defects to the code base under test, and tracking of the coupling of the code base and defect diagnostics to intelligently determine when to re-test the code base or update test cases.

It should be noted that the developer computing device 102 may be a portable computing device, either by a user's ability to move the developer computing device 102 to different locations, or by the developer computing device 102's association with a portable platform, such as a plane, train, automobile, or other moving vehicle. It should also be noted that the developer computing device 102 may be any computing device capable of processing information as described above and in more detail below. For example, the developer computing device 102 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The test platform 106 may include any testing environment suitable for execution of test cases against a code base. The defect monitoring database 108 provides storage capabilities for information associated with the automated tracking of code base and defect diagnostic coupling with automated triage performed by the developer computing device 102. As such, the defect monitoring database 108 may include a code repository, defect information storage, defect and code base correlation information storage, and other information storage, as appropriate for a given implementation.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
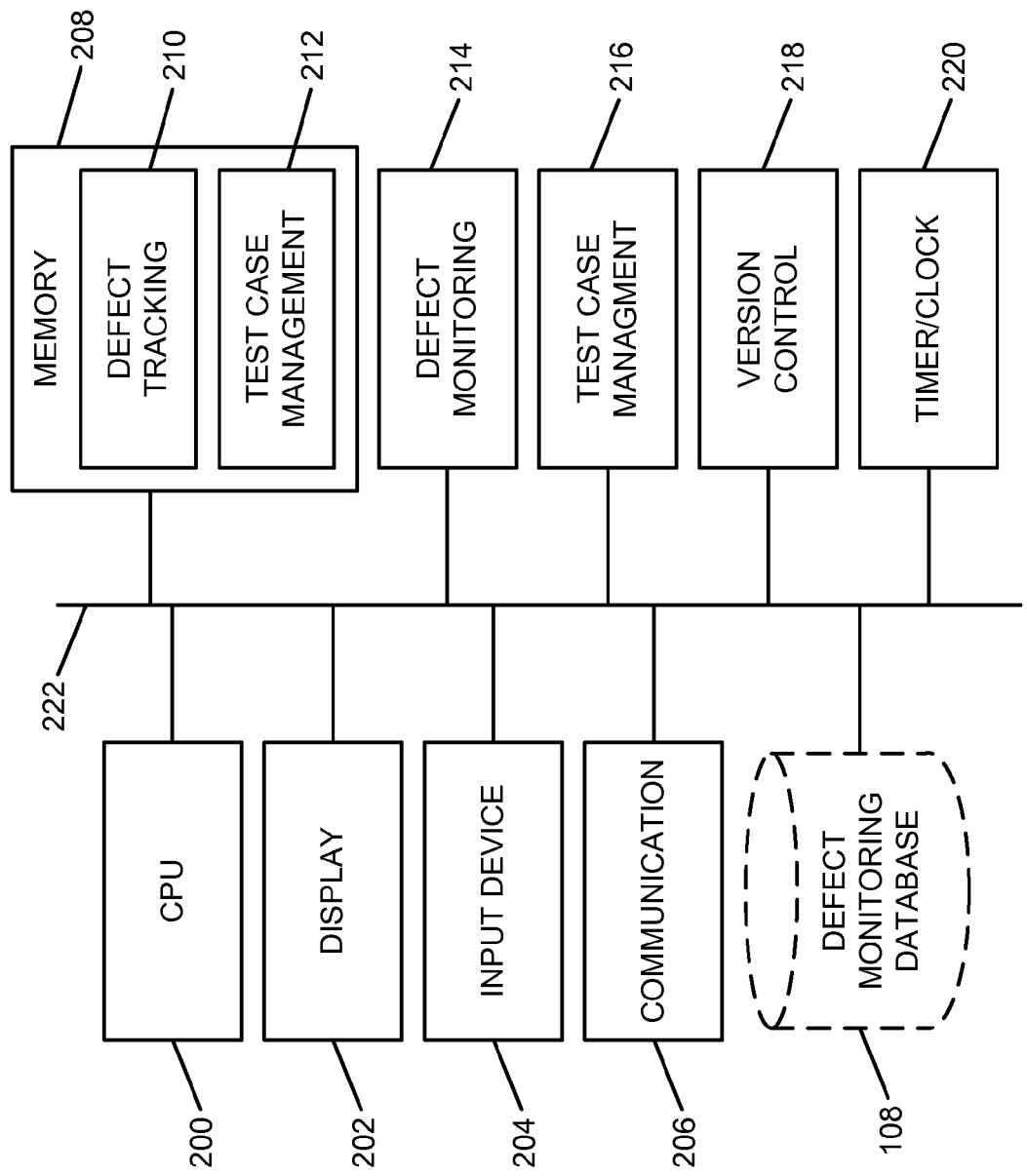
FIG. 2 is a block diagram of an example of an implementation of a developer computing device that is capable of performing automated tracking of code base and defect diagnostic coupling with automated triage according to an embodiment of the present subject matter.

FIG. 2 is a block diagram of an example of an implementation of the developer computing device 102 that is capable of performing automated tracking of code base and defect diagnostic coupling with automated triage. A central processing unit (CPU) 200 provides computer instruction execution, computation, and other capabilities within the developer computing device 102. A display 202 provides visual information to a user of the developer computing device 102 and an input device 204 provides input capabilities for the user.

The display 202 may include any display device, such as a cathode ray tube (CRT), liquid crystal display (LCD), light emitting diode (LED), electronic ink displays, projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the developer computing device 102 to communicate with other modules within the system 100, such as the test platform 106 and the defect monitoring database 108, to perform the processing described herein. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

The defect monitoring database 108 is also shown associated with the developer computing device 102 with a dashed-line representation to show that the defect monitoring database 108 may alternatively be operatively coupled to the developer computing device 102 without requiring a network connection for storage of and access to the information stored within the defect monitoring database 108.

A memory 208 includes a defect tracking storage area 210 that stores information for identified code segments associated with detected/identified defects. A test case management storage area 212 stores information for management of information associated with tracking of code base and defect diagnostic coupling, such as for generation of notifications to re-execute test cases and other information, as described above and in more detail below.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, an operating system storage area, a code execution area, and a data area without departure from the scope of the present subject matter.

A defect monitoring module 214 is also illustrated. The defect monitoring module 214 provides tracking of code base changes and coupling of defect diagnostics for the developer computing device 102, as described above and in more detail below. The defect monitoring module 214 implements the automated tracking of code base and defect diagnostic coupling with automated triage of the developer computing device 102.

A test case management module 216 provides test case management functionality for the developer computing device 102, such as initiation of test cases and other functionality. A version control module 218 provides code version control functionality for the developer computing device 102.

A timer/clock module 220 is illustrated and used to determine timing and date information, such as timing for execution of test cases, as described above and in more detail below. As such, the defect monitoring module 214 may utilize information derived from the timer/clock module 220 for information processing activities, such as automated tracking of code base and defect diagnostic coupling with automated triage.

The respective modules of the developer computing device 102 are illustrated as component-level modules for ease of illustration and description purposes. However, it should be noted that these modules may include any hardware, programmed processor(s), and memory used to carry out the respective functions of these modules as described above and in more detail below. For example, the modules may include additional controller circuitry in the form of application specific integrated circuits (ASICs), processors, antennas, and/or discrete integrated circuits and components for performing communication and electrical control activities associated with the respective devices. Additionally, the respective modules may include interrupt-level, stack-level, and application-level modules as appropriate. Furthermore, the modules may include any memory components used for storage, execution, and data processing for performing processing activities associated with the respective modules.

It should be noted that the defect monitoring module 214, the test case management module 216, and the version control module 218 may be combined into a single module without departure from the scope of the present subject matter. It should also be noted that the defect monitoring module 214, the test case management module 216, and the version control module 218 may form a portion of other circuitry described without departure from the scope of the present subject matter. Further, these modules may alternatively be implemented as one or more applications stored within the memory 208. In such an implementation, the module(s) may include instructions executed by the CPU 200 for performing the functionality described herein. The CPU 200 may execute these instructions to provide the processing capabilities described above and in more detail below for the developer computing device 102. The module(s) may further form a portion of an interrupt service routine (ISR), a portion of an operating system, a portion of a browser application, or a portion of a separate application without departure from the scope of the present subject matter.

The CPU 200, the display 202, the input device 204, the communication module 206, the memory 208, the defect monitoring module 214, the test case management module 216, the version control module 218, and the defect monitoring database 108 are interconnected via an interconnection 222. The interconnection 222 may include a system bus, a network, or any other interconnection capable of providing the respective components with suitable interconnection for the respective purpose.

While the developer computing device 102 is illustrated with and has certain components described, other modules and components may be associated with the developer computing device 102 without departure from the scope of the present subject matter. Additionally, it should be noted that, while the developer computing device 102 is described as a single device for ease of illustration purposes, the components within the developer computing device 102 may be co-located or distributed and interconnected via a network without departure from the scope of the present subject matter. For a distributed arrangement, the display 202 and the input device 204 may be located at a workstation or other location, while the CPU 200 and memory 208 may be located at a local or remote server. Many other possible arrangements for components of the developer computing device 102 are possible and all are considered within the scope of the present subject matter. It should also be understood that, though the defect monitoring database 108 is shown as a separate component, the information stored within the defect monitoring database 108 may additionally/alternatively be stored within the memory 208 without departure from the scope of the present subject matter. Accordingly, the developer computing device 102 may take many forms and may be associated with many platforms.

Figure 3:
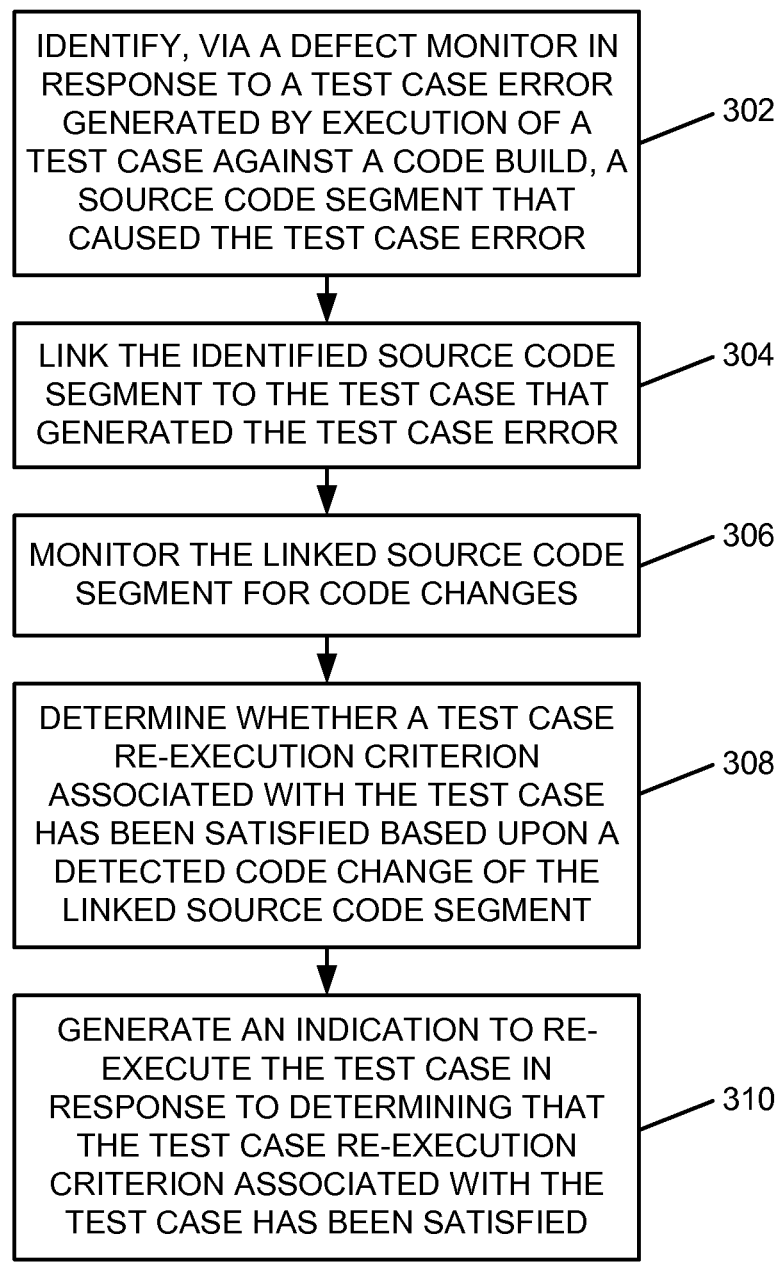
FIG. 3 is a flow chart of an example of an implementation of a process for automated tracking of code base and defect diagnostic coupling with automated triage according to an embodiment of the present subject matter.
Figure 4:
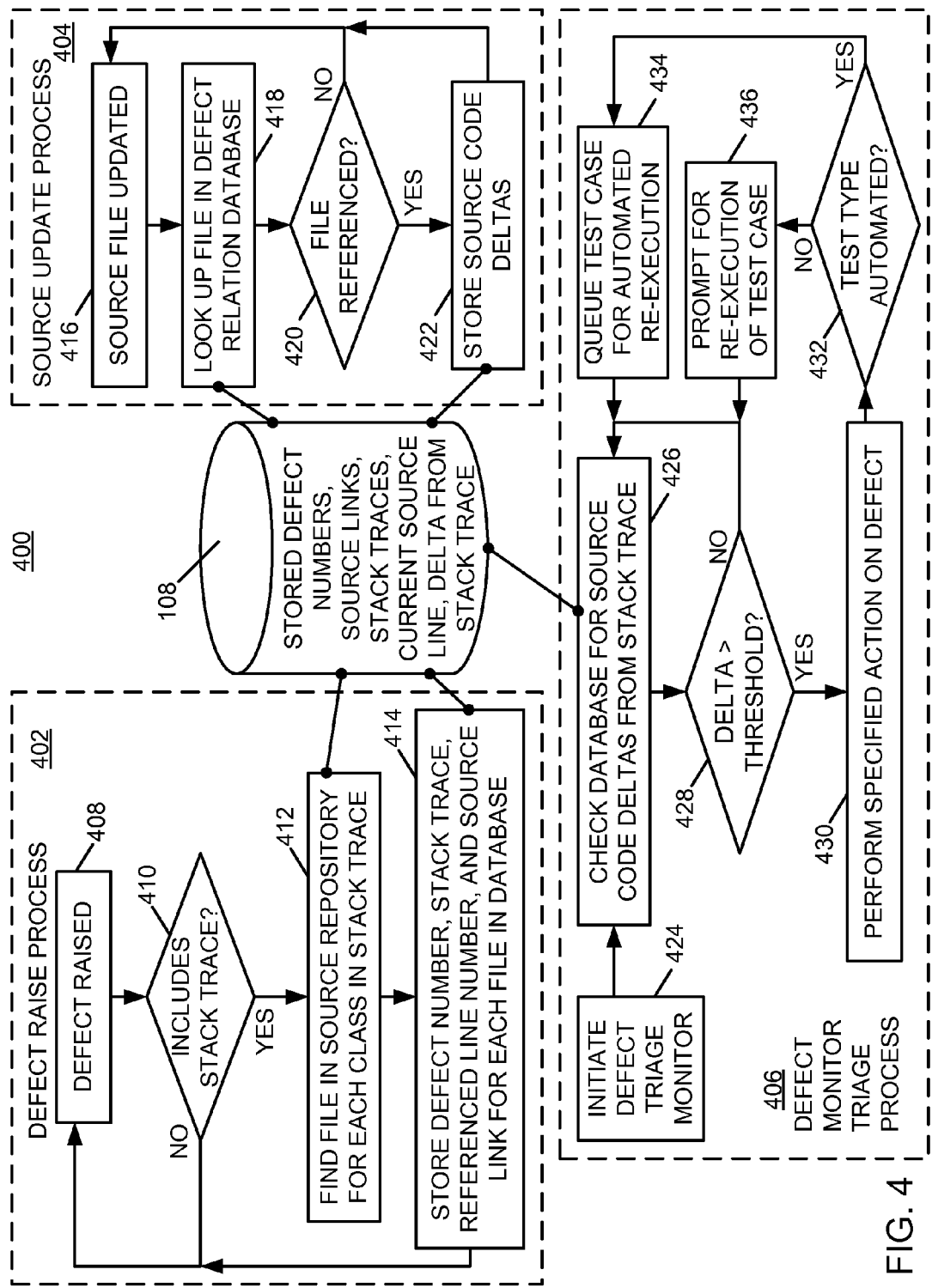
FIG. 4 is a flow process block diagram of an example of an implementation of a process for automated tracking of code base and defect diagnostic coupling with automated triage according to an embodiment of the present subject matter.
Figure 5:
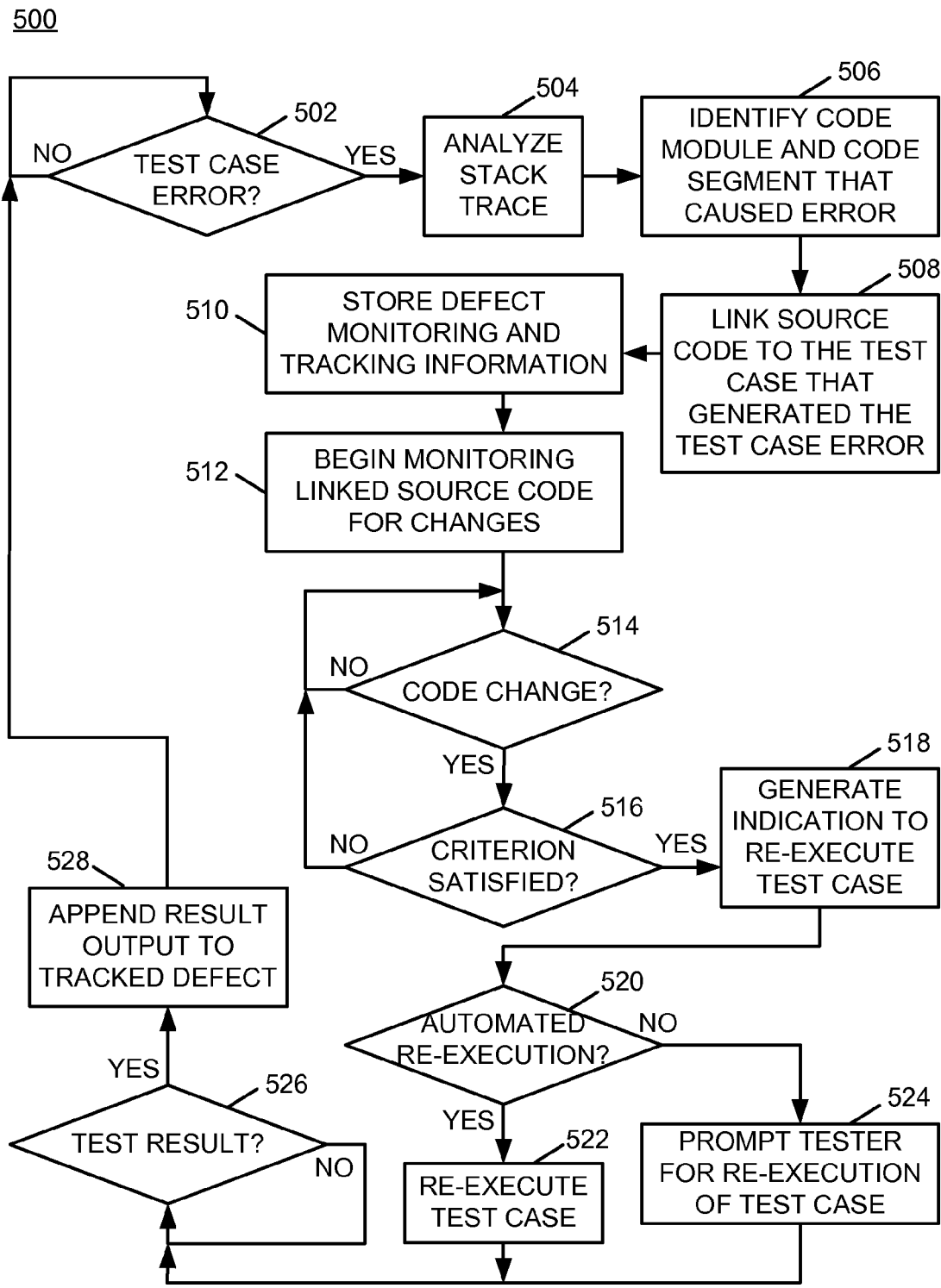
FIG. 5 is a flow chart of an example of an implementation of a process for automated tracking of code base and defect diagnostic coupling with automated triage performed by a developer computing device according to an embodiment of the present subject matter.

FIG. 3 through FIG. 5 below describe example processes that may be executed by devices, such as the developer computing device 102, to perform the automated tracking of code base and defect diagnostic coupling with automated triage associated with the present subject matter. Many other variations on the example processes are possible and all are considered within the scope of the present subject matter. The example processes may be performed by modules, such as the defect monitoring module 214 and/or executed by the CPU 200 or other modules, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated tracking of code base and defect diagnostic coupling with automated triage. At block 302, the process 300 identifies, via a defect monitor in response to a test case error generated by execution of a test case against a code build, a source code segment that caused the test case error. At block 304, the process 300 links the identified source code segment to the test case that caused the test case error. At block 306, the process 300 monitors the linked source code segment for code changes. At block 308, the process 300 determines whether a test case re-execution criterion associated with the test case has been satisfied based upon a detected code change of the linked source code segment. At block 310, the process 300 generates an indication to re-execute the test case in response to determining that the test case re-execution criterion associated with the test case has been satisfied.

FIG. 4 is a flow process block diagram of an example of an implementation of a process 400 for automated tracking of code base and defect diagnostic coupling with automated triage. The process 400 includes a defect raise process 402, a source update process 404, and a defect monitor triage process 406.

Within the defect raise process 402, at block 408 a defect associated with a code base under test is raised. For example, a test case error associated with a test case may be detected/identified. At decision point 410, the defect raise process 402 makes a determination as to whether the identified defect includes a stack trace. For purposes of the present example, stack traces are utilized to perform the monitoring and tracking operations described. As such, in response to determining that the identified defect that has been raised does not include a stack trace, the defect raise process 402 returns to block 408 to await a new defect. In response to determining that the identified defect that is raised includes a stack trace, the defect raise process 402 analyzes the stack trace associated with the test case error and finds a source file in the source code repository for each class identified in the stack trace at block 412. For example, the defect process 402 may determine, via the stack trace analysis, an executed code module that caused the test case error, identify a source code module used to generate the executed code module, and identify at least a portion of the identified source code module as a source code segment within a source file. For purposes of the present example, it is assumed that the defect monitoring database 108 also includes a source code repository and that the source code is identified within the defect monitoring database 108. However, it should be understood that any other storage device suitable for storage of source code may be utilized as a source code repository as appropriate for a given implementation. At block 414, the defect raise process 402 links the test case error to the identified source code segment by storing a defect number, the stack trace, at least one referenced line number within the source code, and the source link for each file that was found within the defect monitoring database 108, and returns to block 408 to await a new defect.

The source update process 404 monitors source code, such as via a revision control system or otherwise to determine at block 416 whether any source file has been updated. At block 418, the source update process 404 looks up the file in a defect relation database that is the defect monitoring database 108 within the present example. At decision point 420, the source update process 404 makes a determination as to whether the file that has been identified to have been updated is referenced within the defect monitoring database 108 as being coupled/linked to any identified defects by the defect raise process 402. In response to determining that the source file that has been updated is not referenced within the defect monitoring database 108 as a tracked source file, the source update process 404 returns to block 416 to await another source file update. In response to determining at decision point 420 that the file is referenced/linked in association with a defect, at block 422 the source update process 404 stores any identified source code changes/deltas within the updated source file to the defect monitoring database 108 for use by the defect monitor triage process 406, as described in more detail below. The source update process 404 returns to block 416 to await another source file update.

The defect monitor triage process 406 begins at block 424 by initiation of the defect triage monitor. At block 426, the defect monitor triage process 406 checks the defect monitor database 108 for code changes/deltas from the initial stack trace associated with one or more raised defects identified within the defect monitor database 108. At decision point 428, the defect monitor triage process 406 makes a determination as to whether a source code change/delta identified for any tracked defect is greater than a configured threshold for source code changes. It should be noted that a threshold for source code changes may be individually configured for each defect or globally configured as appropriate for a given implementation. In response to determining at decision point 428 that the source code change/delta is not greater than the configured threshold for any tracked defects, the defect monitor triage process 406 returns to block 426 and iterates as described above.

In response to determining that the source code delta is greater than the configured threshold for at least one tracked defect, the defect monitor triage process 406 performs a specified action on each defect for which the source code change/delta exceeds the configured threshold at block 430. For example, the defect monitor triage process 406 may append a comment indicating that the diagnostics for the respective defect are out of date. Alternatively, the defect monitor triage process 406 may identify a failing test case. Many other possibilities exist for specified actions that may be configured to be performed in response to a source code change/delta exceeding a configured threshold, and all are considered within the scope of the present subject matter.

At decision point 432, the defect monitor triage process 406 makes a determination as to whether the test type associated with any tracked defect for which the source code change/delta has exceeded the configured threshold is an automated test. In response to determining that the test type is automated, the defect monitor triage process 406 queues the test case for automated re-execution at block 434. In response to determining that the test type is not automated, the defect monitor triage process 406 prompts a tester for re-execution of the test case at block 436. In response to queuing the test case for automated re-execution at block 434, or in response to prompting a tester for re-execution of the test case at block 436, the defect monitor triage process 406 returns to block 426 and iterates as described above.

It should be noted that queuing the test case for automated re-execution at block 434 may include scheduling the test to be executed within a test suite during the next scheduled test execution batch, or may include triggering automated re-execution of the test case immediately or at expiration of any subsequent time period. Further, prompting the tester for re-execution of the test case at block 436 may include generating an email or other message to the tester to indicate that re-execution of a particular test may be performed at the earliest opportunity or otherwise as appropriate for a given implementation.

As such, the defect raise process 402, the source update process 404, and the defect monitor triage process 406 operate collaboratively within the process 400 to identify defects, identify source code updates, and process source code change/deltas to trigger re-execution of testing and to determine whether tests are out of date, respectively. It should be understood that the process 400 and each of the sub-processes may be executed by a device, such as the defect monitoring module 214 of the developer computing device 102.

FIG. 5 is a flow chart of an example of an implementation of a process 500 for automated tracking of code base and defect diagnostic coupling with automated triage performed by a developer computing device, such as the developer computing device 102. At decision point 502, the process 500 makes a determination as to whether a test case error (e.g., defect) has been detected. For purposes of the present example, it is assumed that a test case has been initiated, for example by a test case management tool or a defect management tool or by internal processing associated with the defect monitoring module 214 executing the process 500.

In response to determining that a test case error has been detected, the process 500 analyses a stack trace associated with the detected test case error at block 504. At block 506, the process 500 identifies a code module and code segment that caused the error from the stack trace. Identification of the code module and code segment that caused the error from the stack trace may include determining, via stack trace analysis, an executed code module that caused the test case error, identifying a source code module used to generate the executed code module, and identifying at least a portion of the identified source code module as the source code segment. The code module and source code segment may include, for example, a method or procedure identified within the stack trace associated with the detected defect. At block 508, the process 500 links the identified code module and/or source code segment to the test case that generated the test case error/defect to couple the source code to the identified defect. At block 510, the process 500 stores defect monitoring and tracking information for the linked source code and defect. The tracking information may include, for example, a defect number or other identifier of the test case error, a source code link to the linked source code segment, the analyzed stack trace associated with the test case error, a referenced method/procedure name, one or more line numbers of the method/procedure, and any other information as appropriate for a given implementation.

At block 512, the process 500 begins monitoring the linked source code segment for changes. For example, a code repository, such as a database code repository, may be checked for code changes/deltas for one or more linked source code segments. Further, monitoring the linked source code segment for changes may include setting a timer associated with the timer/clock module 220. Checking the code repository for at least one code change may include checking the code repository in response to expiration of at least one of a configured plurality of time intervals defined by expiration of the timer associated with the timer/clock module 220. At decision point 514, the process 500 makes a determination as to whether a code change has been detected/identified for any linked source code segment. A code change may be detected, for example, by a notification from a defect management tool, a version control tool, a test case management tool, or from a database code repository. Alternatively, the process 500 may monitor a code base to identify code changes/deltas to code segments. The monitoring for code changes/deltas may include periodically checking the source code segment associated with the identified defect for changes. The monitoring for code changes/deltas may also include determining whether the defect is still relevant to the source code segment in view of changes to the code segment associated with a tracked defect. Many other possibilities exist for determining whether a code segment has changed and all are considered within the scope of the present subject matter.

In response to determining that a code change/delta has been detected at decision point 514, the process 500 makes a determination at decision point 516 as to whether one or more test case re-execution criteria associated with the test case has been satisfied based upon a detected code change of the linked source code segment. As described above, this determination may include a comparison of the code change to a configured code change threshold or configured code change delta to determine whether the code change threshold has been met or exceeded. The configured code change threshold or delta may be configured based upon a test case priority of the test case, a length of execution time of the test case, whether a configured number (e.g., X) lines of code have changed in one of the methods/procedures in the stack trace, whether line numbers in the stack trace have changed more than a configured amount (e.g., Y), or any other determination appropriate for a given implementation. Further, determining whether a test case re-execution criterion associated with the test case has been satisfied based upon a detected code change of the linked source code segment may include comparing a stack trace associated with the test case error with a new version of the linked source code segment, and may further include determining whether the new version of the linked source code segment has diverged from the identified source code segment linked to the test case error and referenced by the stack trace, and/or determining that a function named in the stack trace has been deleted, renamed, and/or moved to a different source code file. Many other possibilities exist for determining whether the test case re-execution criterion associated with the test case has been satisfied based upon the detected code change of the linked source code segment and all are considered within the scope of the present subject matter.

In response to determining at decision point 516 that a test case re-execution criterion associated with the test case has not been satisfied based upon a detected code change of the linked source code segment, the process 500 returns to decision point 514 and iterates as described above. In response to determining at decision point 516 that a test case re-execution criterion associated with the test case has been satisfied based upon a detected code change of the linked source code segment, the process 500 generates an indication to re-execute the test case at block 518. As described above, an indication to re-execute the test case may be generated by alerting a separate automated test module to re-execute the test case, by emailing or otherwise notifying a tester that the code has sufficiently diverged from a code level the defect was raised against to justify re-execution of the test case, by appending a comment to a test setup indicating that the diagnostics are out of date, or by any other notification method appropriate for a given implementation.

At decision point 520, the process 400 makes a determination as to whether to perform an automated re-execution of the test case. This determination may include a determination as to whether the test case is still relevant to the tracked source code segment. In response to determining to perform an automated re-execution of the test case, the process 500 re-executes the test case at block 522. As described above, re-execution of the test case may include immediate re-execution of the test case, scheduling the test case for re-execution within a batch of test cases, or other automated re-execution of the test case as appropriate for a given implementation. In response to determining not to perform an automated re-execution of the test case, the process 500 prompts a tester to re-execute the test case at block 524.

In response to either re-executing the test case at block 522 or prompting a tester to re-execute the test case at block 524, the process 500 makes a determination at decision point 526 as to whether a test case result output has been received in response to the re-execution of the test. In response to determining that the result output has been received in response to the re-execution of the test case, the process 500 appends the result output to the tracked defect at block 528. It should be noted that a successful result output may render the tracked defect obsolete and the tracked defect may be removed from the monitoring of tracked defects for the process 500.

It should additionally be noted that the processing of beginning and completing any particular test case may vary and the wait time for a test result output, either from an automated test case or a manual test case, may also vary. As such, the process 500 may be configured to periodically or aperiodically check for test results, be notified of test results by a test case management or other tool, as appropriate for a given implementation. It should additionally be noted that multiple defects may be tracked and that the processing described in association with the process 500 may be executed for each such defect concurrently. As such, waiting for a result output for a test case associated with one defect would not preclude monitoring for code changes/deltas associated with other tracked defects or other processing described. In response to appending the result output to the tracked defect at block 528 and performing any additional processing as described above, the process 500 returns to decision point 502 to await a new test case error.

As such, the process 500 identifies defects associated with a code base and couples tracking of the code base and defect diagnostics. The process 500 identifies divergence of the code base and performs automated triage in response to determinations of divergence of the code base from the code base against which a defect was raised.

As described above in association with FIG. 1 through FIG. 5, the example systems and processes provide automated tracking of code base and defect diagnostic coupling with automated triage. Many other variations and additional activities associated with automated tracking of code base and defect diagnostic coupling with automated triage are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a code repository; and
    a processor programmed to:
        identify, in response to a test case error generated by execution of a test case against a code build, a source code segment within the code repository that caused the test case error, where the processor is programmed to analyze a stack trace associated with the test case error;
        link the identified source code segment to the test case that generated the test case error, where the processor is programmed to store an identifier of the test case error, a source code link to the linked source code segment, and the stack trace associated with the test case error as defect monitoring and tracking information;
        monitor the linked source code segment within the code repository for code changes;
        determine whether a test case re-execution criterion associated with the test case has been satisfied based upon a detected code change of the linked source code segment; and
        generate an indication to re-execute the test case in response to determining that the test case re-execution criterion associated with the test case has been satisfied.

2. The system of claim 1, where, in being programmed to identify, in response to the test case error generated by execution of the test case against the code build, the source code segment that caused the test case error, the processor is further programmed to:
    determine, via the stack trace analysis, an executed code module that caused the test case error;
    identify a source code module used to generate the executed code module; and
    identify at least a portion of the identified source code module as the source code segment.

3. The system of claim 1, where, in being programmed to monitor the linked source code segment for code changes, the processor is programmed to check the code repository for at least one code change of the linked source code segment, and the processor is further programmed to:
    identify the at least one code change of the linked source code segment within the code repository as the detected code change.

4. The system of claim 3, where, in being programmed to check the code repository for the at least one code change of the linked source code segment, the processor is programmed to check the code repository for the at least one code change in response to expiration of at least one of a configured plurality of time intervals.

5. The system of claim 1, where, in being programmed to determine whether the test case re-execution criterion associated with the test case has been satisfied based upon the detected code change of the linked source code segment, the processor is programmed to determine whether a code change threshold has been exceeded, where the code change threshold is configured based upon one of a test case priority of the test case and a length of execution time of the test case.

6. The system of claim 1, where, in being programmed to determine whether the test case re-execution criterion associated with the test case has been satisfied based upon the detected code change of the linked source code segment, the processor is programmed to at least one of:

compare the stack trace associated with the test case error with a new version of the linked source code segment; and one of:

determine whether the new version of the linked source code segment has diverged from the identified source code segment linked to the test case error and referenced by the stack trace; and determine that a function named in the stack trace has been one of deleted, renamed, and moved to a different source code file.

7. The system of claim 1, where the processor is further programmed to:

re-execute the test case in response to the generation of the indication to re-execute the test case;

receive a result output from the re-execution of the test case; and append the result output to the test case.

8. A computer program product comprising a computer readable storage medium including computer readable program code, where the computer readable program code when executed on a computer causes the computer to:

identify, in response to a test case error generated by execution of a test case against a code build, a source code segment that caused the test case error, where the computer readable program code when executed on the computer causes the computer to analyze a stack trace associated with the test case error;

link the identified source code segment to the test case that generated the test case error, where the computer readable program code when executed on the computer causes the computer to store an identifier of the test case error, a source code link to the linked source code segment, and the stack trace associated with the test case error as defect monitoring and tracking information;

monitor the linked source code segment for code changes;

determine whether a test case re-execution criterion associated with the test case has been satisfied based upon a detected code change of the linked source code segment; and generate an indication to re-execute the test case in response to determining that the test case re-execution criterion associated with the test case has been satisfied.

9. The computer program product of claim 8, where, in causing the computer to identify, in response to the test case error generated by execution of the test case against the code build, the source code segment that caused the test case error, the computer readable program code when executed on the computer further causes the computer to:

determine, via the stack trace analysis, an executed code module that caused the test case error;

identify a source code module used to generate the executed code module; and identify at least a portion of the identified source code module as the source code segment.

10. The computer program product of claim 8, where, in causing the computer to monitor the linked source code segment for code changes, the computer readable program code when executed on the computer causes the computer to check a code repository for at least one code change of the linked source code segment and the computer readable program code when executed on the computer further causes the computer to:

identify the at least one code change of the linked source code segment within the code repository as the detected code change.

11. The computer program product of claim 10, where, in causing the computer to check the code repository for the at least one code change of the linked source code segment, the computer readable program code when executed on the computer causes the computer to check the code repository for the at least one code change in response to expiration of at least one of a configured plurality of time intervals.

12. The computer program product of claim 8, where, in causing the computer to determine whether the test case re-execution criterion associated with the test case has been satisfied based upon the detected code change of the linked source code segment, the computer readable program code when executed on the computer causes the computer to determine whether a code change threshold has been exceeded, where the code change threshold is configured based upon one of a test case priority of the test case and a length of execution time of the test case.

13. The computer program product of claim 8, where, in causing the computer to determine whether the test case re-execution criterion associated with the test case has been satisfied based upon the detected code change of the linked source code segment, the computer readable program code when executed on the computer causes the computer to at least one of:

compare the stack trace associated with the test case error with a new version of the linked source code segment; and one of:

determine whether the new version of the linked source code segment has diverged from the identified source code segment linked to the test case error and referenced by the stack trace; and determine that a function named in the stack trace has been one of deleted, renamed, and moved to a different source code file.

14. The computer program product of claim 8, where the computer readable program code when executed on the computer further causes the computer to:

re-execute the test case in response to the generation of the indication to re-execute the test case;

receive a result output from the re-execution of the test case; and append the result output to the test case.

\* \* \* \* \*